(12) United States Patent
Watson et al.

(10) Patent No.: US 10,984,196 B2
(45) Date of Patent: Apr. 20, 2021

(54) DISTRIBUTED SYSTEM FOR EVALUATION AND FEEDBACK OF DIGITAL TEXT-BASED CONTENT

(71) Applicant: International Business Machines Corporation, Armonk, NY (US)

(72) Inventors: Patrick D. Watson, Ossining, NY (US); Maria D. Chang, Irvington, NY (US); Jae-Wook Ahn, Nanuet, NY (US); Sharad Sundararajan, Yorktown Heights, NY (US); Tengfei Ma, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 15/868,399

(22) Filed: Jan. 11, 2018

(65) Prior Publication Data

US 2019/0213256 A1 Jul. 11, 2019

(51) Int. Cl.
*G06F 40/30* (2020.01)
*G06N 3/08* (2006.01)
(Continued)

(52) U.S. Cl.
CPC ............ *G06F 40/30* (2020.01); *G06F 16/93* (2019.01); *G06F 40/205* (2020.01); *G06N 3/0445* (2013.01); *G06N 3/08* (2013.01)

(58) Field of Classification Search
CPC ........ G06F 40/30; G06F 16/93; G06F 40/205; G06N 3/0445
(Continued)

(56) References Cited

U.S. PATENT DOCUMENTS 5,321,611 A 6/1994 Clark et al.
5,466,159 A 11/1995 Clark et al.
(Continued)

OTHER PUBLICATIONS

Culotta, Aron, et al. "Corrective Feedback and Persistent Learning for Information Extraction." Artificial Intelligence, vol. 170, No. 14-15, 2006, pp. 1101-1122., doi:10.1016/j.artint.2006.08.001. (Year: 2006).*

(Continued)

*Primary Examiner* — Stephen S Hong
*Assistant Examiner* — Broderick C Anderson
(74) *Attorney, Agent, or Firm* — Patterson + Sheridan, LLP

(57) ABSTRACT

Method and apparatus for generating natural language observations using sequence-to-sequence models are provided. The method includes receiving a first electronic document and dynamically generating, without requiring user intervention, a first natural language observation corresponding to a first portion of the first electronic document by processing the first portion of the first electronic document using a first sequence-to-sequence model. A second natural language observation is received for the first portion of the first electronic document, and the generated first natural language observation and the authoritative natural language observation are provided. The method further includes receiving an evaluation of the first natural language observation and the second natural language observation, and refining the first sequence-to-sequence model based on the evaluation of the first natural language observation and second natural language observation.

17 Claims, 8 Drawing Sheets

(51) Int. Cl.
*G06N 3/04* (2006.01)
*G06F 16/93* (2019.01)
*G06F 40/205* (2020.01)

(58) Field of Classification Search
USPC ......................................................... 715/264
See application file for complete search history.

(56) References Cited

U.S. PATENT DOCUMENTS

| | | | |
|---|---|---|---|
| 7,155,157 | B2 | 12/2006 | Kaplan |
| 9,685,095 | B2 | 6/2017 | Olsen |
| 10,198,436 | B1* | 2/2019 | Dockhorn ............. G06F 40/106 |
| 2006/0282255 | A1* | 12/2006 | Lu ........................... G06F 40/45 |
| | | | 704/2 |
| 2007/0219776 | A1* | 9/2007 | Gamon ................... G06F 40/20 |
| | | | 704/9 |
| 2013/0253940 | A1* | 9/2013 | Zziwa .................... G06Q 50/22 |
| | | | 705/2 |
| 2014/0065593 | A1* | 3/2014 | Gannon ................... G09B 3/06 |
| | | | 434/350 |
| 2014/0067377 | A1* | 3/2014 | Reiter ................... G06F 40/154 |
| | | | 704/9 |
| 2015/0051896 | A1* | 2/2015 | Simard ................... G06F 40/58 |
| | | | 704/2 |
| 2015/0356431 | A1 | 12/2015 | Saxena et al. |
| 2015/0364049 | A1* | 12/2015 | Smith ...................... G09B 5/12 |
| | | | 434/319 |
| 2016/0035237 | A1 | 2/2016 | Nealon et al. |
| 2018/0276525 | A1* | 9/2018 | Jiang ................... G06F 16/3329 |
| 2018/0329883 | A1* | 11/2018 | Leidner ................ G06F 40/117 |
| 2019/0180165 | A1* | 6/2019 | Vinyals .................... G06N 3/02 |

OTHER PUBLICATIONS

Essay Exam Grading Assistant ip.com Disclosure No. IPCOM000247062D Publication Date: Jul. 31, 2016.

* cited by examiner

700

705
Receive a first plurality of electronic documents, wherein each of the plurality of electronic documents comprises one or more portions, wherein each of the one or more portions is associated with a corresponding natural language observation

710
Train a first sequence-to-sequence model, wherein each of the one or more portions is provided as input to the first sequence-to-sequence model, and wherein, for each of the one or more portions, the associated corresponding natural language observation is provided as target output of the first sequence-to-sequence model

715
Receive a first electronic document

720
Dynamically generate, by operation of one or more computer processors and without user intervention, a first natural language observation by processing a first portion of the first input electronic document using the first sequence-to-sequence model

FIG. 7

DISTRIBUTED SYSTEM FOR EVALUATION AND FEEDBACK OF DIGITAL TEXT-BASED CONTENT

BACKGROUND

The present invention relates to neural networks, and more specifically, to generating natural language using sequence-to-sequence models.

Recurrent neural networks can be used to process arbitrary sequences of input in a variety of ways, and have proven to be quite effective for a wide array of natural language processing tasks. As compared to traditional neural networks, which treat each input in a sequence as independent from the rest of the sequence, recurrent neural networks can produce output for each portion of an input sequence based in part on previous computations for other portions of the input sequence. This makes them especially adept at processing natural language.

SUMMARY

According to one embodiment of the present disclosure, a method is provided. The method includes receiving a first electronic document and dynamically generating, without requiring user intervention, a first natural language observation corresponding to a first portion of the first electronic document by processing the first portion of the first electronic document using a first sequence-to-sequence model. Additionally, a second natural language observation is received for the first portion of the first electronic document. Both the generated first natural language observation and the second natural language observation are provided, and an evaluation of the first natural language observation and the second natural language observation are received. Finally, the method includes refining the first sequence-to-sequence model based on the evaluation of the first natural language observation and second natural language observation.

A second embodiment of the present disclosure includes a computer-readable storage medium having computer-readable program code embodied therewith. The computer-readable program code is executable by one or more computer processors to perform an operation including receiving a first plurality of electronic documents, wherein each of the plurality of electronic documents comprises one or more portions, wherein each of the one or more portions is associated with a corresponding natural language observation. Further, a first sequence-to-sequence model is trained, wherein each of the one or more portions is provided as input to the first sequence-to-sequence model, and wherein, for each of the one or more portions, the associated corresponding natural language observation is provided as target output of the first sequence-to-sequence model. A first input electronic document is received, and a first natural language observation is dynamically generated, by operation of one or more computer processors and without user intervention, by processing a first portion of the first input electronic document using the first sequence-to-sequence model.

According to a third embodiment of the present disclosure, a system including a processor and a computer memory storing a program is provided. When executed on the processor, the program performs an operation including receiving a first electronic document, dynamically generating, by operation of one or more computer processors and without user intervention, a first natural language observation by processing a first portion of the first electronic document using a first sequence-to-sequence model, and providing the first generated natural language observation.

BRIEF DESCRIPTION OF THE SEVERAL VIEWS OF THE DRAWINGS

FIG. 7 is a flow diagram illustrating a method according to one embodiment of the present disclosure.

DETAILED DESCRIPTION

Figure 1:
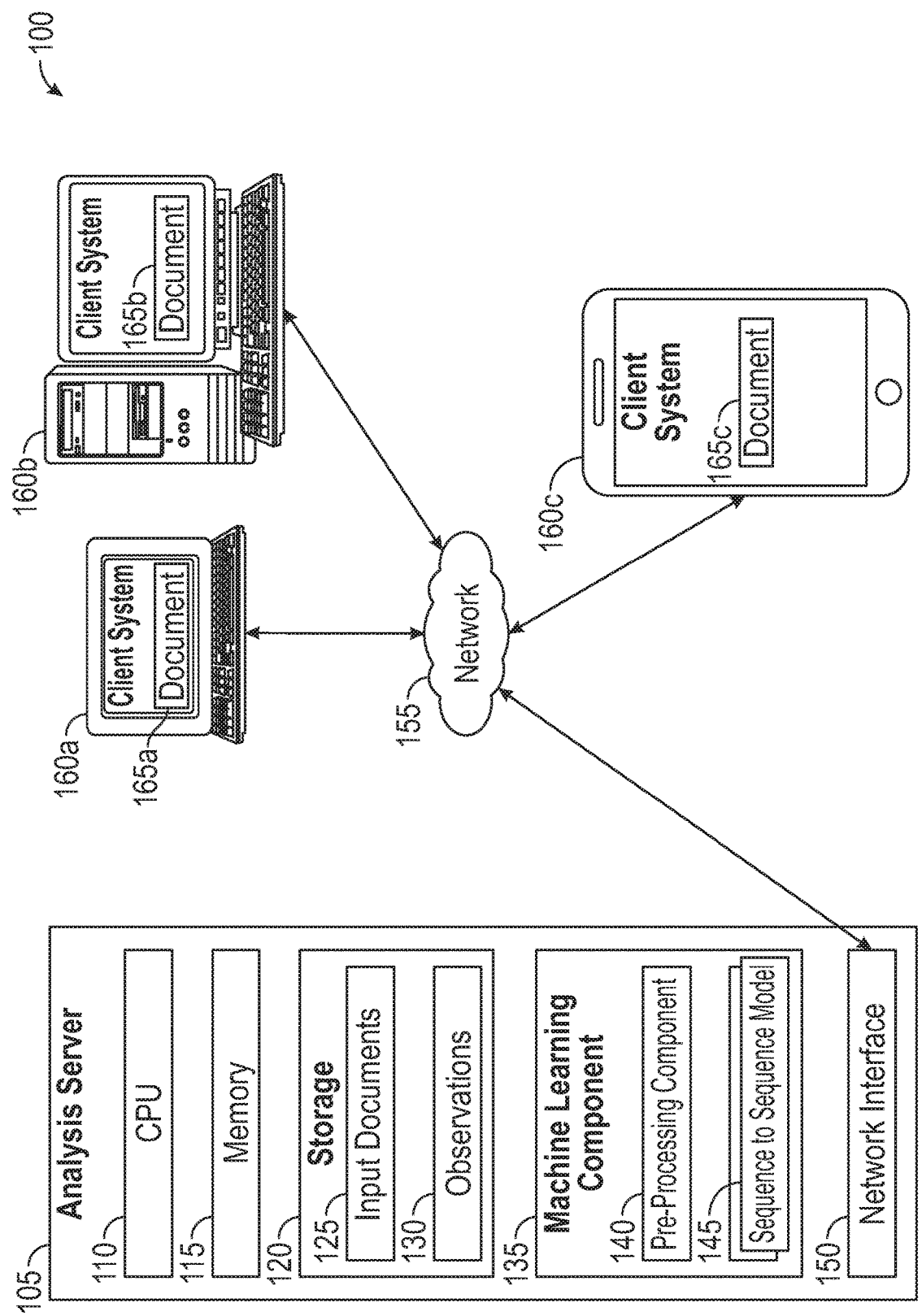
FIG. 1 illustrates a system diagram of an environment capable of implementing embodiments of the present disclosure.

Most writing involves a substantial amount of proofreading, editing, and continuous revisions. This is true regardless of the skill of the writer, as even work produced by experts often requires significant revisions. All types of writing benefit from such revisionary process. For example, essays, papers, and books almost universally undergo revisions in order to achieve a satisfactory result. Similarly, letters and emails, text messages, and the like frequently benefit from at least a cursory review and revision before sending, particularly in a professional setting. Even non-natural language documents, such as program code, benefit from review and revision in order to ensure an accurate and efficient product.

Although many individuals review and edit their own work, it is advantageous to have a second person provide critiques and feedback, as the second person is often better situated to spot problems or idiosyncrasies that go unnoticed by the original writer. This is especially true when the writer is a novice or inexperienced individual, and the reviewer is an authoritative or expert in the domain. For example, students submit their work to a more advanced student, or ideally to a teacher or professor, in order to ensure they receive high quality and accurate feedback that they can use to improve their writing. Similarly, employees or interns responsible for drafting memorandums, opinions, announcements, or any other type of document in a workplace setting frequently must send drafts to a supervising mentor or superior who provides feedback and suggestions to improve the writing. In another domain, novice or inexperienced coders frequently provide their code to an expert or experienced individual who can review it to ensure that the coder uses appropriate data structures and algorithms, and thereby produces high quality code.

Of course, although such revisions are particularly important for novice writers, even highly experienced individuals can benefit from providing their written work to another qualified individual for review. Generally, the quality of the end result is dependent on the quality of the feedback received. For example, feedback provided by an experienced professor is likely to be significantly better than feedback received from a fellow student, which will in turn results in significantly improved writings. Similarly, even if an experienced reviewer is available to provide feedback, if they do not have sufficient time to review the document thoroughly, the resulting feedback will of course be of a lower quality, which will result in a worse final product.

This problem is particularly significant when editors are in short supply as compared to the content producers. Generally, the best feedback would be expert annotations at natural break points in the work. For example, for natural language textual documents like books, essays, and papers, specific feedback for each chapter, page, paragraph, or sentence would be tremendously beneficial and improve the process of drafting all types of documents. Similarly, to assist with creating program code, it would be beneficial to receive annotations for each line or block of code, for each subroutine, for each class or method, or any other structure used in the code. This dramatically improves the quality of the final code, and thereby improves the efficiency of human coders. Unfortunately, however, such detailed and specific feedback is not possible using traditional methods.

For example, a given teacher is typically responsible for providing feedback to a relatively large number of students simultaneously. Similarly, there are usually a large number of journalists for each editor, and significantly more authors than there are proofreaders with a given publisher. In such situations, even providing cursory feedback at a high level becomes difficult, and it is impossible to provide revisions with high granularity. This makes the feedback expensive and time-consuming, and dramatically slows the production of content because of the bottleneck caused by editing. Additionally, the feedback received is always subjective, and no two reviewers would provide the same observations or feedback for the same draft. Furthermore, even an experienced or expert reviewer often provides different feedback depending on a variety of factors not relevant to the quality of the work itself. For example, factors such as time of day, the environment around the reviewer, the mental state of the reviewer, and a wide variety of factors unrelated to the work can influence the observations the reviewer provides. There is no satisfactory solution to these problems.

One solution that has been attempted involves crowd-sourcing observations. For example, a teacher can redistribute student work to other students, such that each student has a few other students offer observations or revisions. This methodology, however, is not ideal because there is no method to verify the quality of the reviewer or the feedback received, and it is typically low quality. Similarly, a user may upload a document for feedback from individuals on the interne, but there is no system in place to ensure the received feedback is high quality. Further, this approach is entirely ineffective for highly technical or specialized domains, where there are simply not a sufficient number of people with the necessary expertise. Embodiments disclosed herein enable the use of sequence-to-sequence models in recurrent neural networks to provide autonomous feedback with high granularity. Furthermore, in an embodiment, the generated observations are provided in natural language and provide far more guidance than simply scoring or grading the work. Rather, in an embodiment, the generated feedback is actionable in that it provides clear direction about how to improve the work. Additionally, the generated observations are objective and consistent, in that two equal documents would receive equal observations, regardless of when they are submitted or who authored them.

Furthermore, in some embodiments, sequence-to-sequence models can be trained to process relatively lower quality feedback and produce relatively higher quality feedback, as will be described in more detail below. This allows sparse data sets to be augmented with additional higher quality feedback. In various embodiments, feedback may be identified as high or low quality based on a variety of factors, including the author of the feedback. For example, feedback provided by a user who is identified as experienced or an expert may be considered "high quality" without further consideration, while feedback provided by a user identified as a "novice" may be determined to be "low quality" or "unknown quality." Similarly, if it is not known which user provided the feedback, or it is not known how experienced the user is, the feedback may be identified as "unknown quality." In some embodiments, provided feedback can be scored and ranked by other users, as is discussed in more detail below, in order to determine the quality of the feedback.

Turning to FIG. 1, a system diagram of an environment 100 capable of implementing embodiments of the present disclosure is illustrated. As shown, Analysis Server 105 includes a CPU 110, a Memory 115, a Storage 120, a Machine Learning Component 135, and a Network Interface 150. In an embodiment, Analysis Server 105 corresponds to a physical computing system, and may operate in a cloud computing environment. In some embodiments, Analysis Server 105 may operate as a virtual system on one or more physical computing systems. CPU 110 retrieves and executes programming instructions stored in Memory 115, and also stores and retrieves application data residing in Storage 120. Note that CPU 110 is representative of a single CPU, multiple CPUs, a single CPU having multiple processing cores, and the like. Memory 115 is generally included to be representative of a random access memory. Storage 120 may be a disk drive storage device, solid state drive, or the like. Although shown as a single unit, Storage 120 may be a combination of fixed and/or removable storage devices, such as fixed disc drives, removable memory cards, or optical storage, network attached storage (NAS), or a storage area-network (SAN).

As illustrated, the environment 100 also includes three Client Systems 160a-c, each of which contains a Document 165a-c. As illustrated, Client System 160a is a laptop, Client System 160b is a desktop computer, and Client System 160c is a mobile device such as a smart phone. Any computing device capable of performing the functions discussed herein may be used as a client system, however. Furthermore, although not illustrated, each Client System 160a-c typically includes one or more processors, as well as storage and memory. Each of the Client Systems 160a-c is configured to communicate through Network 155 with Analysis Server 105. In some embodiments, Analysis Server 105 operates as a cloud system that provides services for the various Client Systems 160a-c. In other embodiments, however, Analysis Server 105 is a local system that each Client System 160a-c accesses over a local network, such as within a single business or school.

In the illustrated embodiment, Storage 120 of Analysis Server 105 contains Input Documents 125 and corresponding Observations 130. Although illustrated as residing in Storage 120, Input Documents 125 and Observations 130 may reside in Memory 115, or may be stored in one or more remote repositories. Similarly, although illustrated as separate entities, Input Documents 125 and Observations 130 may in fact be a single data structure. For example, in an embodiment, a document may have comments and annotations embedded within it, and thereby store both an input document and accompanying observations in a single data structure. Additionally, in some embodiments, a single file may contain a number of fields, where a first field contains the relevant input text, and one or more second fields contain the corresponding observation(s). Similarly, as will be discussed below in more detail, in some embodiments, Input Documents 125 and accompanying Observations 130 are not stored at all.

Machine Learning Component 135, as illustrated, includes a Pre-Processing Component 140 and one or more Sequence-to-Sequence Models 145. As will be discussed in more detail below, Machine Learning Component 135 is generally configured to receive textual documents of arbitrary length (e.g., of any length), such as Input Documents 125, and generate one or more a natural language observations. In some embodiments, documents are provided to the Sequence-to-Sequence Models 145 with no pre-processing at all. In other embodiments, however, it is necessary or helpful to pre-process input data in order to facilitate its use with the models. For example, in an embodiment, Pre-Processing Component 140 may generate one or more feature vectors for the input document. In this embodiment, a feature vector is a vector having any number of dimensions which represents a numerical representation of the associated data. For example, the characters, words, or sentences of an Input Document 125 may be converted to vectors. In some embodiments, this vectorization of the data may be required for functionality, or may simply improve the speed, efficiency, and/or accuracy of the system.

In a related embodiment, Pre-Processing Component 140 processes the input documents or a vectorization thereof by reversing the ordering of the words. In some embodiments, the Sequence-to-Sequence Models 145 can operate more efficiently and more accurately when the input sequence is reversed. This may be because reversing the input string affects the short and long-term dependencies of the input string, which changes how the Sequence-to-Sequence Model 145 processes the data. This is discussed in more detail below, with reference to FIG. 2. In embodiments, any type of pre-processing that aids the use of the data with Sequence-to-Sequence Models 145 can be accomplished by Pre-Processing Component 140. This may include the removal of stop words or punctuation in some embodiments, though in other embodiments it is preferable to process the textual input without removing any words or punctuation.

Figure 2:
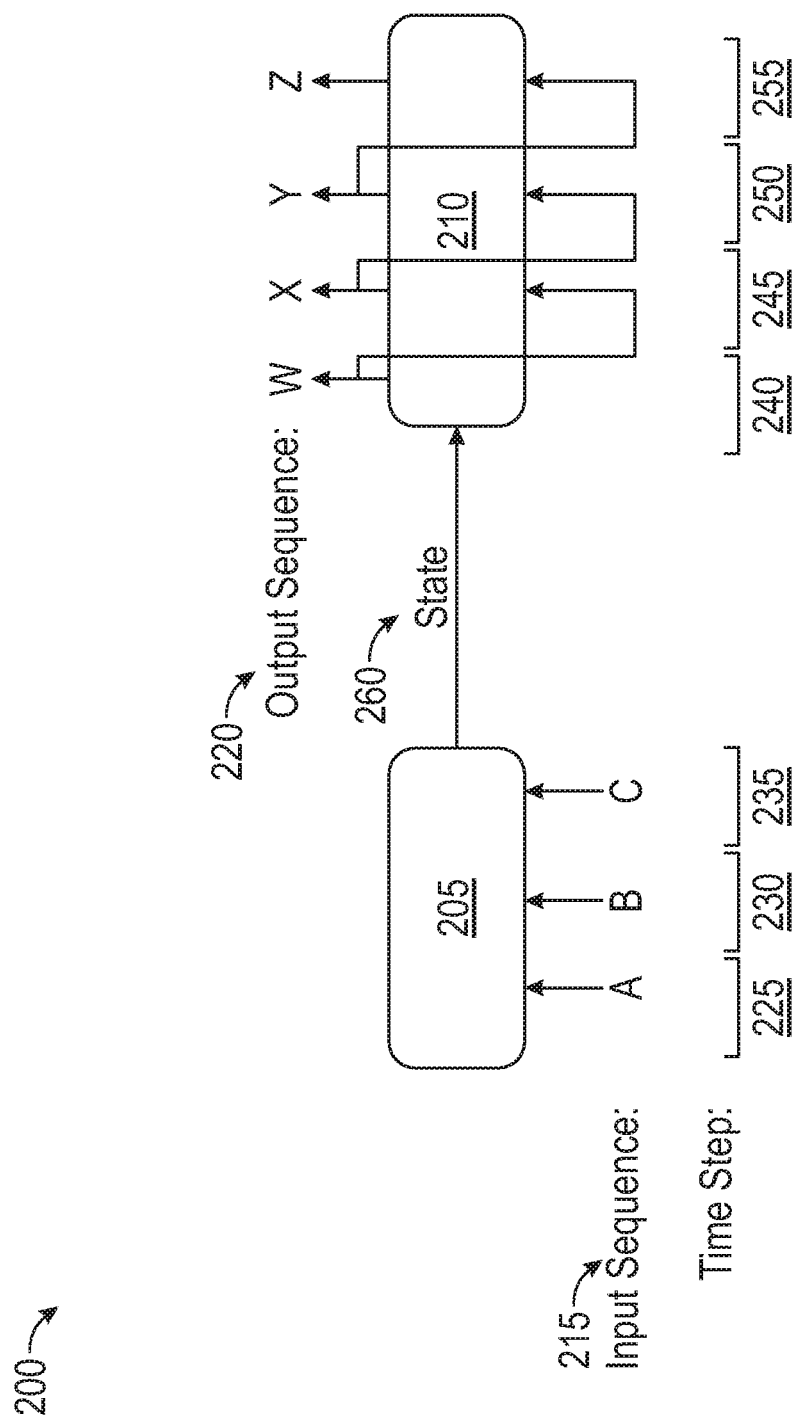
FIG. 2 is a block diagram illustrating a sequence-to-sequence model, according to one embodiment of the present disclosure.

FIG. 2 is a block diagram illustrating the operation of a sequence-to-sequence model 200, according to one embodiment of the present disclosure. Generally, a Sequence-to-Sequence model 200 includes two main sections, an Encoder 205 and a Decoder 210. Each of the Encoder 205 and Decoder 210 may be recurrent neural network layer, or a stack thereof. Additionally, though not illustrated, each of the recurrent neural network layers (or stacks thereof) that make up Encoder 205 and Decoder 210 may include any number of recurrent neural network cells. In an embodiment, each of the cells is a long short-term memory (LSTM) cell. As illustrated, the Sequence-to-Sequence Model 200 receives an Input Sequence 215 and produces an Output Sequence 220. For example, in the illustrated embodiment, the Input Sequence 215 is "ABC" and the target Output Sequence 220 is "WXYZ." In an embodiment, the Input Sequence 215 and Output Sequence 220 can be any length, and need not be the same length.

In order to generate Output Sequence 220, the Input Sequence 215 is provided to the Encoder 205 one piece at a time. For example, in the illustrated embodiment, the Input Sequence 215 is provided one letter at a time. In many embodiments, however, the Input Sequence 215 is provided word-by-word rather than letter-by-letter. In some embodiments, the Input Sequence 215 is provided line-by-line, sentence-by-sentence, or some other delineation. In the illustrated embodiment, the first block of Input Sequence 215, "A," is provided to Encoder 205 at Time Step 225. Next, at Time Step 230, the second portion, "B," is provided. Finally, at Time Step 235, the final portion of the Input Sequence 215, "C," is provided to Encoder 205. In some embodiments, a special character is provided to Encoder 205 to signal the end of the input sequence. For example, an [END] or [STOP] symbol or character. Similarly, in some embodiments, a special character is used to signify the beginning of an Input Sequence 215, such as a [START] or [BEGIN] symbol.

In the illustrated embodiment, only the internal State 260 of Encoder 205 is provided to Decoder 210. That is, data representing the current State 260 of Decoder 205 at Time Step 235 is passed to Encoder 210, and any output generated by the Encoder 205 when processing the Input Sequence 215 is discarded. In some embodiments, however, this output may be used by Decoder 210 to help generate Output Sequence 220. Further, in some embodiments, a [START] or [BEGIN] symbol may be used to initiate the output of Decoder 210. As illustrated, Decoder 210, upon receiving State 260, generates an output character "W" at Time Step 240. This output "W" is appended to the Output Sequence 220, and then provided to the Decoder 210 as the next input at Time Step 245. At Time Step 245, Decoder 210 produces another output character "X," which is similarly appended to the end of Output Sequence 220, and provided as input to Decoder 210 at Time Step 250. Also at Time Step 250, based on the input "X," output character "Y" is generated and appended to the Output Sequence 220. At Time Step 255, this output character is provided as input to Decoder 210 to generate output character "Z." In some embodiments, this output character "Z" is then provided as input to Decoder 210, which generates a [STOP] token or some other equivalent, signifying that the Output Sequence 220 has been completed.

Thus, Sequence-to-Sequence Model 200, once trained, can generate Output Sequence 220 "WXYZ" when provided Input Sequence 215 "ABC." In order to train the Sequence-to-Sequence Model 200, a similar process is used, but in an embodiment, rather than providing the output of Decoder 210 as input in the next Time Step, the target Output Sequence 220 is provided. For example, in the embodiment illustrated by FIG. 2, where Sequence-to-Sequence Model 200 is being trained to generate "WXYZ" when provided "ABC," the encoding process proceeds as above. That is, at each Time Step 225, 230, and 235, the next character of Input Sequence 215 is provided to Encoder 205. Of course, as discussed above, in some embodiments, the Input Sequence 215 is a sentence or other string of characters, and the input is provided one word at a time, as delineated by spaces. Once the final character of Input Sequence 215 (or a [STOP] symbol) is provided to Encoder 205, the internal State 260 of Encoder 205 is provided to Decoder 210.

Similarly to above, when the State 260 is provided to Decoder 210, some output is produced at Time Step 240. Rather than providing that output as input at Time Step 245, however, in an embodiment the desired Output Sequence 220 is provided, one character at a time, as input to Decoder 210. This may be referred to as "teacher forcing," and essentially trains the Decoder 210 to generate the Target Sequence 220 when provided with the Target Sequence 220, offset by one Time Step. That is, providing Target Sequence 220 during decoding, regardless of the actual output produced, trains and conditions the Sequence-to-Sequence Model 200 to produce the Target Sequence 220. Thus, in the illustrated embodiment, "W" is first provided as input to Decoder 210. At the next Time Step, "X" is provided as input, regardless of the output. This continues until the entire Target Sequence 220 has been provided as input. In some embodiments, a [STOP] token is also utilized. In this way, once the Sequence-to-Sequence Model 200 has been trained, Input Sequence 215 "ABC" can be provided to automatically generate Output Sequence 220 "WXYZ."

As discussed above, in some embodiments it is beneficial to reverse Input Sequence 215 when providing it to Encoder 205. That is, rather than providing "A," followed by "B," followed by "C," in an embodiment, the character ordering is reversed: "C," followed by "B," followed by "A." Similarly, if Input Sequence 215 is "The quick brown fox," the sequence may be provided to Encoder 205 as "fox brown quick The." Reversing the word ordering of Input Sequence 215 may be utilized during training of the Sequence-to-Sequence Model 200, as well as during use to actually generate Output Sequence 220. During training, however, the target Output Sequence 220 is still provided to Decoder 210 in the correct order, rather than reversed. Of course, as discussed above, Input Sequence 215 may also be vectorized before being provided to Sequence-to-Sequence Model 200.

Figure 3:
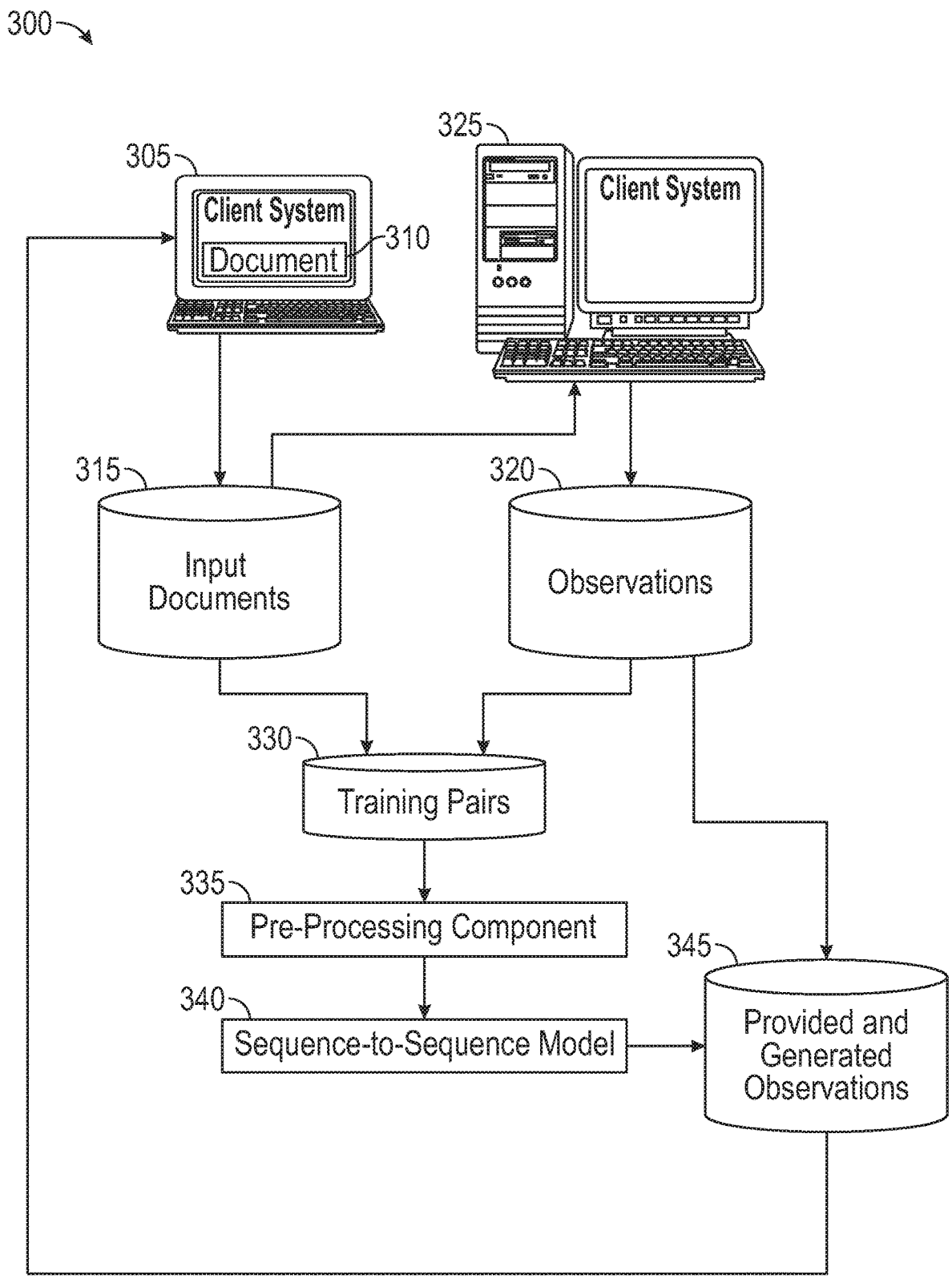
FIG. 3 illustrates a system capable of implementing an embodiment of the present disclosure.

FIG. 3 illustrates a system 300 capable of implementing an embodiment of the present disclosure. As illustrated, System 300 includes two Client Systems 305 and 325, a corpus of Input Documents 315, a corpus of natural language Observations 320, a Pre-Processing Component 335, a Sequence-to-Sequence Model 340, and a pool of Provided and Generated Observations 345. In the illustrated embodiment, Client System 305 may be operated by a student, intern, or other novice user, and provides a Document 310 to the pool of Input Documents 315. Client System 325, which may be operated by a teacher, senior employee, or other authoritative or experienced user, retrieves Input Documents 315 and provides natural language observations as Observations 320. For example, Client System 305 can be used to provide Document 310 to a pool like Input Documents 315, for example, by uploading the Document 310. Client System 325 may be used to download the Input Documents 315, annotate them to provide natural language observations, and upload the results.

In the illustrated embodiment, Input Documents 315 and corresponding Observations 320 are combined to create Training Pairs 330. For example, Document 310 and the corresponding natural language observation provided by Client System 325 are collectively a Training Pair 330. In some embodiments, each Input Document 315 is associated with a single natural language observation from Observations 320. In other embodiments, however, Input Documents 315 are partitioned or apportioned into discrete portions. For example, a user may submit a program made up of many lines of code, and all or some of the lines may have a corresponding observation. In this embodiment, each line of code and its corresponding natural language observation constitute a Training Pair 330. Similarly, if a user submits an essay, paper, book, or the like, the Input Document 315 may be apportioned into sentences, where each sentence has a corresponding Observation 320. In this embodiment, each sentence, together with its associated Observation 320, is a Training Pair 330.

In an embodiment, a user may be responsible for partitioning the Input Document 315. For example, a user of Client System 305 may partition the Input Document 315 before providing it to the pool of Input Documents 315. Similarly, a user of Client System 325 may partition the Document 310 while providing natural language observations. In another embodiment, Document 310 is automatically partitioned upon being provided to Input Documents 315. That is, the System 300 may partition each Input Document 315 into portions based on line number, sentences, paragraphs, and the like. These portions may be provided to Client System 325 together or separately for annotation.

Pre-Processing Component 335 may vectorize the Training Pairs 330, and in some embodiments, may also reverse the ordering of the input sequence. The Training Pairs 330 are then used to train Sequence-to-Sequence Model 340. For example, as discussed above, each portion of Input Documents 315 can be provided as Input Sequence 215, and the associated natural language Observation 320 can be provided as a target Output Sequence 220. In this way, Sequence-to-Sequence Mode 340 is trained to generate one or more natural language observations when provided with an Input Document 315. In the illustrated embodiment, in addition to being used to train the Sequence-to-Sequence Model 340, the provided natural language Observations 320 are also provided directly to Client System 305, as illustrated by Provided and Generated Observations 345.

In an embodiment, Document 310 is provided to Sequence-to-Sequence Model 340 to autonomously generate natural language observations, and is also provided to a user of Client System 325, such as an expert, to provide observations. Each of these observations may be pooled in Provided and Generated Observations 345 and provided to Client System 305. In an embodiment, the user of Client System 305 may then evaluate the observations based on their quality. In an embodiment, these evaluations are then used to refine the Sequence-to-Sequence Model 340, for example by adjusting the weights of the model. This evaluation may take the form of a binary reply (e.g., good/bad, helpful/not helpful), or may include a numeric rating (e.g., from 0-10) or a Likert scale (e.g., from not at all helpful to extremely helpful). Similarly, in some embodiments, all of the generated and provided observations for a given portion of Input Document 315 are provided simultaneously, and the user of Client System 305 may rank them in order of usefulness, or select the best and/or worst observations. In this way, the System 300 can train and refine the Sequence-to-Sequence Model 340 while in use generating observations.

In a related embodiment, Sequence-to-Sequence Model 340 can be trained with an existing corpus of Input Documents 315 and corresponding Observations 320, in addition to or instead of training it in real-time during operation. For example, Sequence-to-Sequence Model 340 may be initialized using an existing pool, and then refined during use with actual input documents.

As used in the present disclosure, "observation" refers to a textual natural language observation about all or a portion of a textual document. For example, if the input document is a block of code, a generated observation may be "Use HashMap instead of ArrayList." Similarly, if the input is a paper, one generated observation may be "Ensure your thesis is clear." These observations provide actionable feedback rather than simply grading or scoring the input document, and enable a user to revise the document based on intelligent observations without the need for any second person to provide such observations. Additionally, in an embodiment, the natural language observation may simply include an indication that no actions are needed. For example, the generated observation may be "Looks good," "good work," or an equivalent. In an embodiment, the Sequence-to-Sequence model may generate the "no-action" observation in the same way as other observations, because an experienced user provided "looks good" as an observation for a portion of some other input document that was similar to the current portion. In related embodiment, if an expert has not provided any annotation for a given portion of a training document, the system may automatically attach an observation indicating that no action is required before training the Sequence-to-Sequence model 340 with the portion and the "no-action" observation. Similarly, in an embodiment, the Sequence-to-Sequence model 340 may be trained to generate an empty string, or no output at all other than a [STOP] token for a given input portion. In such an embodiment, a similar portion of an input document that does not require editing would similarly generate an empty string or a [STOP] token upon processing.

Figure 4:
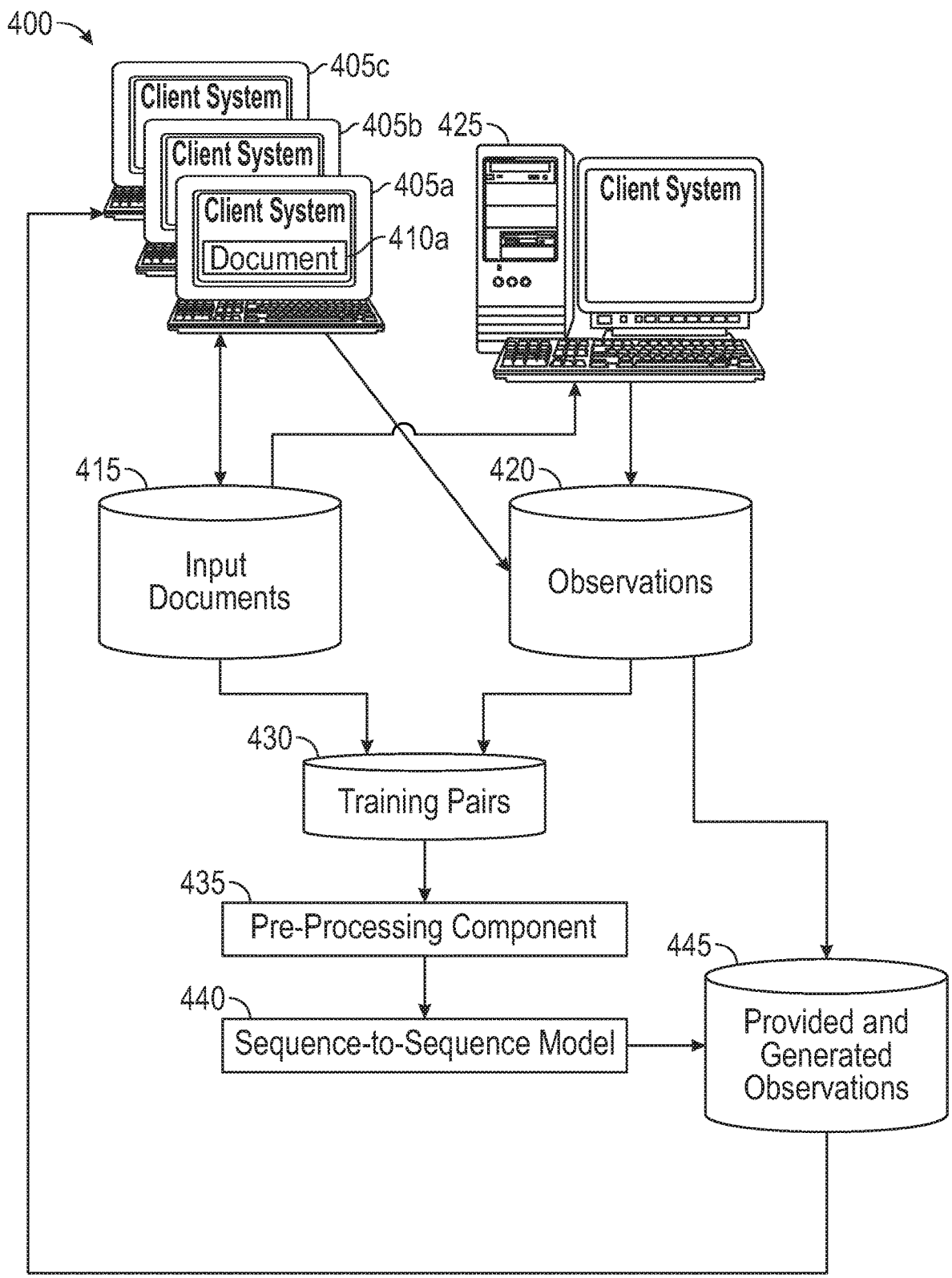
FIG. 4 illustrates a system capable of implementing an embodiment of the present disclosure.

FIG. 4 illustrates a system 400 capable of implementing an embodiment of the present disclosure. Specifically, FIG. 4 illustrates an embodiment that includes observations of unknown quality in order to better train Sequence-to-Sequence Mode 440. In the illustrated embodiment, each Client System 405a-c is used to create textual Documents 410a-c, and provide them to Input Documents 415. Similarly, as above, Client System 425 can be utilized to receive Input Documents 415 and annotate them with authoritative observations, for example, because Client System 425 is used by an experienced or verified user. Additionally, each Client System 405a-c may retrieve Input Documents 415 and provide unverified observations. That is, the observations provided by Client Systems 405a-c are unverified because the user who provided the observation has not been verified to be an authoritative or experienced user, such as a teacher or senior employee.

In the illustrated embodiment, only the observations provided by verified users, e.g., the user of Client System 425, are used in Training Pairs 430 to train Sequence-to-Sequence Model 440. Unverified observations are gathered in Provided and Generated Observations 445, and presented to the Client System 405a-c that provided the initial Document 410a-c. For example, a user of Client System 405a may send Document 410a to Input Documents 415. This Document 410a is then retrieved by Client System 405b-c, as well as Client System 425, and the users of these systems provide corresponding natural language observations. The one or more observations provided by Client System 425 are used as part of a Training Pair 430, as discussed above, while the unverified observations provided by Client Systems 405b-c are not. Similarly, the Document 410a is processed by Sequence-to-Sequence Model 440 to generate one or more generated observations. The provided observations, as well as the one or more generated observations from Sequence-to-Sequence Model 440, are collected and provided to Client System 405a, delineated according to the portion of Document 410a they correspond to, for evaluation. That is, as discussed above, the user of Client System 405a may rank the observations, score them, and the like.

These evaluations can be used to refine the Sequence-to-Sequence Model 440. For example, if a user of Client System 405b consistently receives positive evaluations, the System 400 may determine that the user is a sufficiently qualified to provide authoritative feedback that can be used to train the Sequence-to-Sequence Model 440. In such an embodiment, previous observations and/or future observations from that user may be used to train and refine the Sequence-to-Sequence Model 440. Similarly, in an embodiment, if an unverified observation is evaluated highly, that particular observation may be used to train and refine the Sequence-to-Sequence Model 440, regardless of the qualifications of the user who provided the observation. In this way, the Sequence-to-Sequence Model 440 can be refined and trained more rapidly and accurately, and provide better autonomous observations.

Furthermore, in some embodiments, observations that are identified as lower quality may be used in conjunction with high quality observations in order to train one or more sequence-to-sequence models. In such an embodiment, Machine Learning Component 135 first identifies observations that correspond to the same portion, section, block, or segment of input document. The observations that have been identified as lower quality may be provided as input to the models, while the observations identified as higher quality are provided as the target output. In this way, low quality feedback can be mapped to high quality observations. In some embodiments, this is particularly useful to augment potentially sparse data sets. For example, when a relatively small amount of high quality feedback is available, such as in highly technical fields. In such an embodiment, low quality observations are processed to generate high quality feedback, which may be provided to the user.

Figure 5:
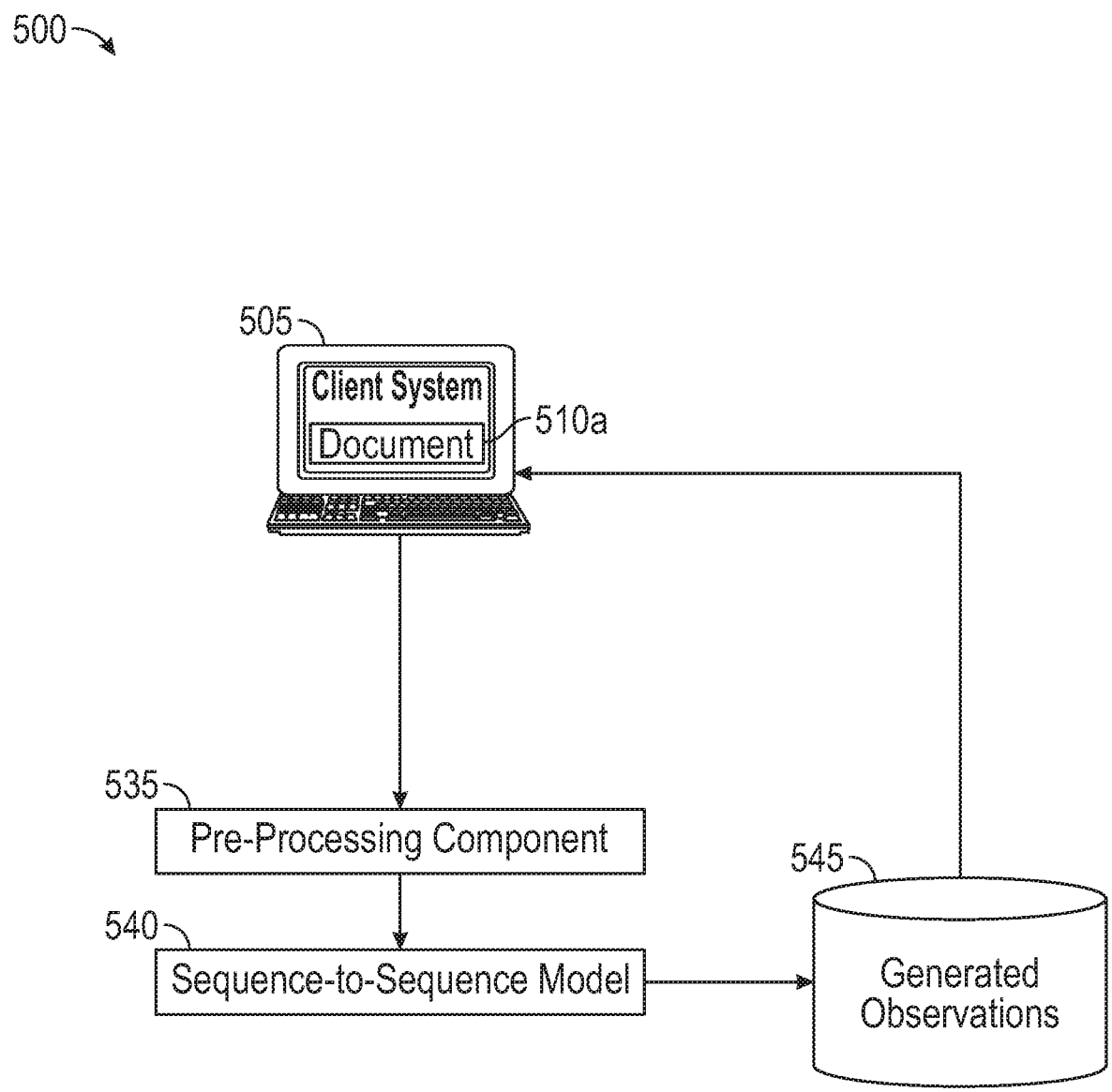
FIG. 5 illustrates a system capable of implementing an embodiment of the present disclosure.

FIG. 5 illustrates a mature system 500 capable of implementing an embodiment of the present disclosure. In the illustrated embodiment, the system has matured and no further training of Sequence-to-Sequence Model 540 is required. As illustrated, a Client System 505 provides any textual Document 510a to the system. The Document 510a may be processed by Pre-Processing Component 535, and then provided to Sequence-to-Sequence Model 540, which generates one or more Generated Observations 545. These observations are then returned to Client System 505. Of course, in an embodiment, it may be desirable to refine or re-train the Sequence-to-Sequence Model 540 from time to time. For example, input documents may be stored and occasionally reviewed by experienced users to provide authoritative observations. Periodically, these observations may be used to further refine the model.

Although not illustrated, in some embodiments the context of the input document is considered when generating corresponding observations. For example, program code requires different feedback than an essay. Similarly, an essay may require different observations than a paper would, and both may differ from a book. Furthermore, the relevant context may include the topic or domain of the document, or the level of skill involved. For example, a paper on complex mathematics requires different types of feedback than a paper on advanced sociology. Similarly, a history essay written at a fifth grade level requires differing feedback from a history essay written in graduate school. Returning to FIG. 1, in an embodiment, Analysis Server 105 may use the context associated with an Input Document 125 to determine which Sequence-to-Sequence Model 145 to use when generating observations. For example, each Sequence-to-Sequence Model 145 may be trained using only documents and observations of a particular context, so that documents associated with that context can be processed using an appropriate Sequence-to-Sequence Model 145.

In an embodiment, a user may tag the document with the appropriate context before submitting it to Analysis Server 105, or may select a Sequence-to-Sequence Model 145 to be used based on the context of the document. In another embodiment, Analysis Server 105 may determine the context based on the account settings of the user who provided the document. In yet another embodiment, the context of a document may be determined from the document itself, for example, based on parsing the document to determine the subject matter and the level of complexity. In each embodiment, the document is provided to the appropriate Sequence-to-Sequence Model 145 based on the context of the document.

Figure 6:
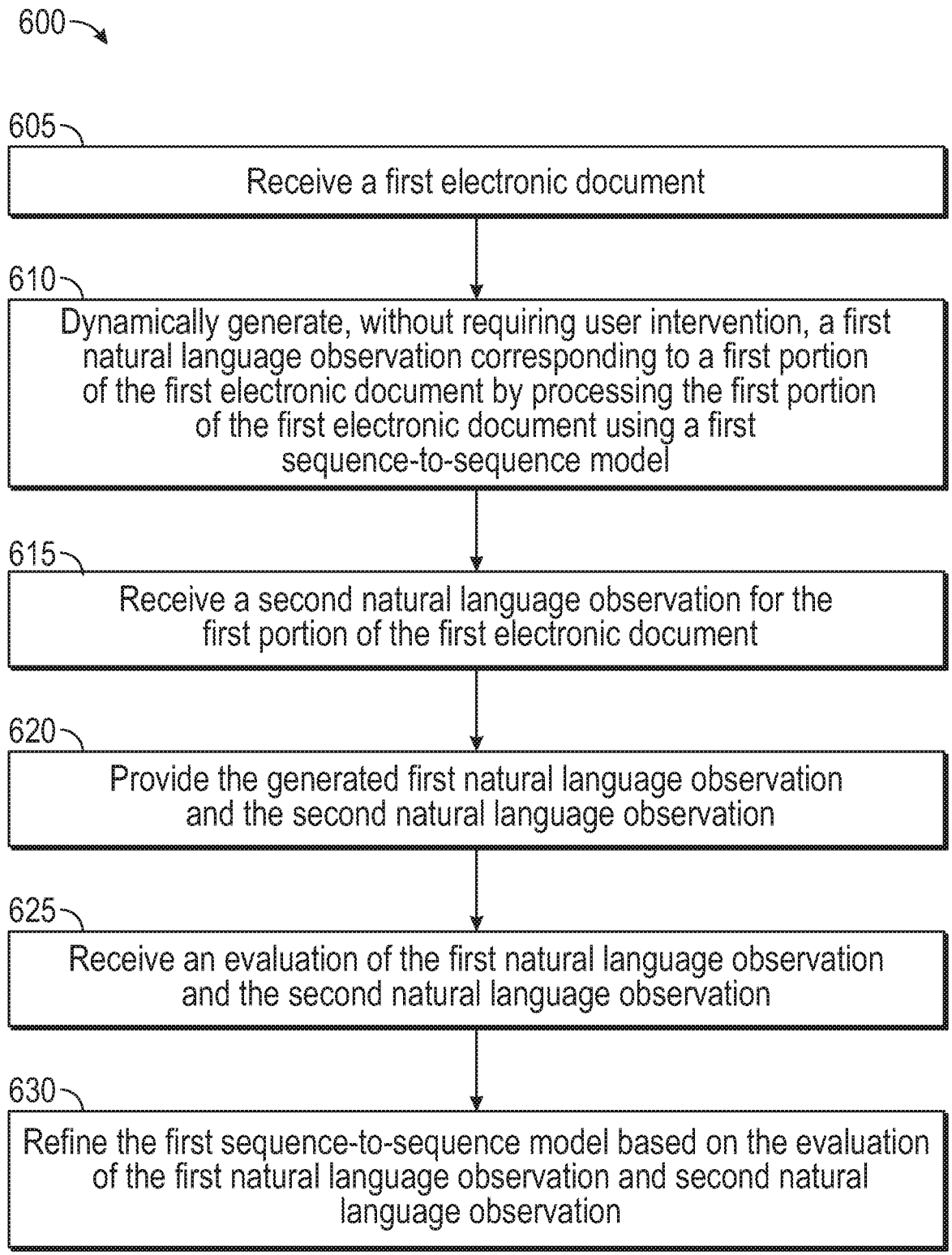
FIG. 6 is a flow diagram illustrating a method according to one embodiment of the present disclosure.

FIG. 6 is a flow diagram illustrating a method 600 according to one embodiment of the present disclosure. The method begins at block 605, where Analysis Server 105 receives a first electronic document. At block 610, Analysis Server 105 dynamically generates, without requiring user intervention, a first natural language observation corresponding to a first portion of the first electronic document by processing the first portion of the first electronic document using a first sequence-to-sequence model. Additionally, Analysis Server 105 receives a second natural language observation for the first portion of the first electronic document at block 615. At block 620, analysis server 105 provides the generated first natural language observation and the second natural language observation. For example, the observations may be provided to a user who submitted the first electronic document. At block 625, Analysis Server 105 receives an evaluation of the first natural language observation and the second natural language observation. Finally, at block 630, Analysis Server 105 refines the first sequence-to-sequence model based on the evaluation of the first natural language observation and second natural language observation.

FIG. 7 is a flow diagram illustrating a method 700 according to one embodiment of the present disclosure. The method begins at block 705, when Analysis Server 105 receives a first plurality of electronic documents, wherein each of the plurality of electronic documents comprises one or more portions, wherein each of the one or more portions is associated with a corresponding natural language observation. At block 710, Analysis Server 105 trains a first sequence-to-sequence model, wherein each of the one or more portions is provided as input to the first sequence-to-sequence model, and wherein, for each of the one or more portions, the associated corresponding natural language observation is provided as target output of the first sequence-to-sequence model. At block 715, Analysis Server 105 receives a first electronic document. Finally, at block 720, Analysis Server 105 dynamically generates, by operation of one or more computer processors and without user intervention, a first natural language observation by processing a first portion of the first input electronic document using the first sequence-to-sequence model.

Figure 8:
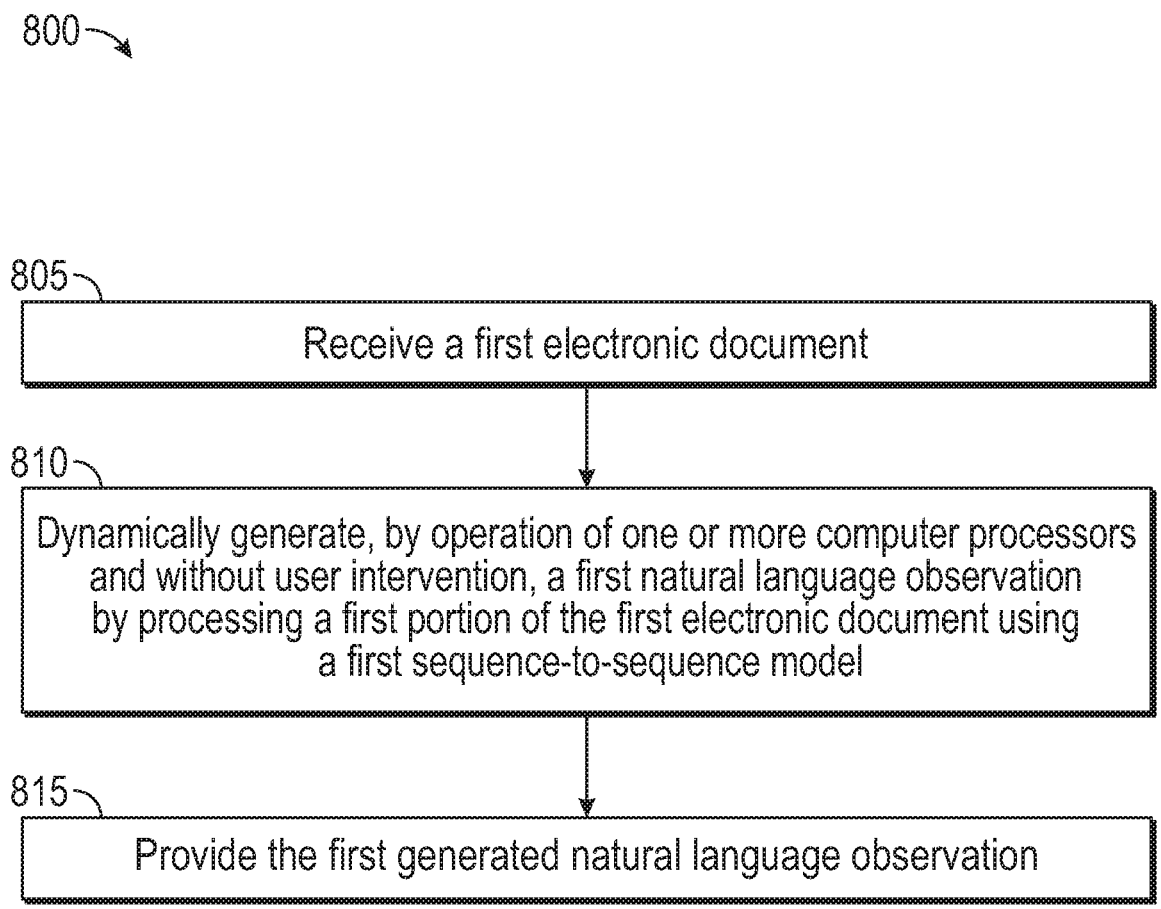
FIG. 8 is a flow diagram illustrating a method according to one embodiment of the present disclosure.

FIG. 8 is a flow diagram illustrating a method 800 according to one embodiment of the present disclosure. At block 805, Analysis Server 105 receives a first electronic document. Analysis Server 105 dynamically generates, by operation of one or more computer processors and without user intervention, a first natural language observation by processing a first portion of the first electronic document using a first sequence-to-sequence model at block 810. At block 815, Analysis Server 105 provides the first generated natural language observation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an application providing sequence-to-sequence models to generate natural language observations) or related data available in the cloud. For example, the Machine Learning Component 135 could execute on a computing system in the cloud and receive textual documents from clients of the cloud. In such a case, the Analysis Server 105 could receive documents, process them to generate natural language observations, and return hose observations at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising: receiving a first electronic document associated with a first context; dynamically generating a first observation expressed using a natural language sequence that critiques a first portion of the first electronic document, wherein the natural language sequence is generated without user intervention by processing the first portion of the first electronic document using a first sequence-to-sequence model associated with the first context; receiving a second observation expressed using natural language that critiques the first portion of the first electronic document; receiving an evaluation of the first observation and the second observation; refining the first sequence-to-sequence model based on the evaluation of the first observation and second observation; receiving a second electronic document associated with a second context; and dynamically generating a third observation using an additional natural language sequence corresponding to a first portion of the second electronic document, wherein the additional natural language sequence is generated without user intervention by processing the first portion of the second electronic document using a second sequence-to-sequence model associated with the second context.

2. The method of claim 1, the method further comprising: receiving a second electronic document; and dynamically generating a third observation expressed using an additional natural language sequence corresponding to a first portion of the second electronic document, wherein the additional natural language sequence is generated without user intervention by processing the first portion of the second electronic document using the first sequence-to-sequence model.

3. The method of claim 1, the method further comprising: receiving a second electronic document; partitioning the second electronic document into a plurality of portions; and dynamically generating, without user intervention, a plurality of observations including a corresponding plurality of natural language sequences generated without user intervention by processing the plurality of portions using the first sequence-to-sequence model, wherein each of the plurality of observations corresponds to one of the plurality of portions.

4. The method of claim 1, wherein the natural language sequence comprises an indication that no actions are needed.

5. The method of claim 1, wherein the first electronic document is provided by a first user and the second observation is provided by a second user.

6. The method of claim 5, the method further comprising: receiving a plurality of unverified natural language observations for the first portion of the first electronic document from a plurality of unverified users; and receiving a plurality of evaluations, wherein each evaluation corresponds to one of the plurality of unverified natural language observations.

7. The method of claim 6, the method further comprising: determining, based on the plurality of evaluations, that at least a first unverified user is an experienced user; and refining the first sequence-to-sequence model based on the unverified natural language observation provided by the first unverified user.

8. The method of claim 1, wherein processing the first portion using the first sequence-to-sequence model comprises vectorizing the first portion.

9. The method of claim 8, wherein processing the first portion using the first sequence-to-sequence model comprises reversing a word ordering of the first portion.

10. A computer-readable storage medium having computer-readable program code embodied therewith, the computer-readable program code executable by one or more computer processors to perform an operation comprising: receiving a first plurality of electronic documents associated with a first context, wherein each of the plurality of electronic documents comprises one or more portions, wherein each of the one or more portions is associated with a corresponding observation expressed using natural language; training a first sequence-to-sequence model associated with the first context, wherein each of the one or more portions is provided as input to the first sequence-to-sequence model, and wherein, for each of the one or more portions, the associated corresponding observation is provided as target output of the first sequence-to-sequence model; receiving a second electronic document associated with a second context; receiving a first input electronic document; dynamically generating a first natural language sequence by processing a first portion of the first input electronic document using the first sequence-to-sequence model and without user intervention; and dynamically generating a second observation expressed using natural language corresponding to a first portion of the second electronic document by processing the first portion of the second electronic document using a second sequence-to-sequence model associated with the second context.

11. The computer-readable storage medium of claim 10, the operation further comprising: receiving an evaluation of the first generated natural language sequence; and refining the first sequence-to-sequence model based on the evaluation of the first generated natural language sequence.

12. The computer-readable storage medium of claim 10, the operation further comprising: receiving a second input electronic document; partitioning the second electronic input document into a plurality of portions; and dynamically generating a plurality of observations expressed using natural language by processing the plurality of portions using the first sequence-to-sequence model without user intervention, wherein each of the plurality of observations corresponds to one of the plurality of portions.

13. The computer-readable storage medium of claim 10, wherein the first observation comprises an indication that no actions are needed.

14. The computer-readable storage medium of claim 10, wherein each of the observations corresponding to the one or more portions of the first plurality of electronic documents is provided by an experienced user.

15. The computer-readable storage medium of claim 14, the operation further comprising: receiving a plurality of unverified natural language observations for the first portion of the first input electronic document from a plurality of unverified users; receiving a plurality of evaluations, wherein each evaluation corresponds to one of the plurality of unverified natural language observations; determining, based on the plurality of evaluations, that at least a first unverified user is an experienced user; and refining the first sequence-to-sequence model based on the unverified natural language observation provided by the first unverified user.

16. A system comprising: a processor; and a computer memory storing a program, which, when executed on the processor, performs an operation comprising: receiving a first electronic document associated with a first context; receiving a second electronic document associated with a second context; dynamically generating a first observation expressed using natural language without human input by processing a first portion of the first electronic document using a first sequence-to-sequence model; and in response to identifying that the first sequence-to-sequence model is not associated with the second context; identifying a second sequence-to-sequence model that is associated with the second context; and dynamically generating a second observation expressed using natural language without human input by processing a first portion of the second electronic document using the second sequence-to-sequence model.

17. The system of claim 16, the operation further comprising: receiving an evaluation of the first generated observation; and refining the first sequence-to-sequence model based on the evaluation of the first generated observation.

\* \* \* \* \*